US010110015B2

(12) United States Patent
Casimir et al.

(10) Patent No.: US 10,110,015 B2
(45) Date of Patent: Oct. 23, 2018

(54) ELECTRICAL CONVERSION AND DISTRIBUTION SYSTEM FOR AN AIRCRAFT

(71) Applicant: Safran Electrical & Power, Blagnac (FR)

(72) Inventors: Roland Casimir, Blagnac (FR); Djemouaï Hadjidj, Blagnac (FR); Vincent Giorgis, Blagnac (FR)

(73) Assignee: Safran Electrical & Power, Blagnac (FR)

( * ) Notice: Subject to any disclaimer, the term of this patent is extended or adjusted under 35 U.S.C. 154(b) by 270 days.

(21) Appl. No.: 15/113,872

(22) PCT Filed: Jan. 28, 2015

(86) PCT No.: PCT/FR2015/050191
§ 371 (c)(1),
(2) Date: Jul. 25, 2016

(87) PCT Pub. No.: WO2015/114249
PCT Pub. Date: Aug. 6, 2015

(65) Prior Publication Data
US 2016/0352129 A1    Dec. 1, 2016

(30) Foreign Application Priority Data

Jan. 31, 2014    (FR) .................................. 14 50782

(51) Int. Cl.
*H02J 4/00*    (2006.01)
*H02J 5/00*    (2016.01)
(Continued)

(52) U.S. Cl.
CPC .................. *H02J 5/00* (2013.01); *H02J 4/00* (2013.01); *H02J 7/007* (2013.01); *H02J 7/0068* (2013.01);
(Continued)

(58) Field of Classification Search
CPC .............................. H02J 4/00; B64D 2221/00
See application file for complete search history.

(56) References Cited

U.S. PATENT DOCUMENTS 7,327,113 B2 *    2/2008    Steigerwald ........ H02M 3/1582
                                                    290/40 B
8,975,784 B2    3/2015    Tardy
(Continued)

FOREIGN PATENT DOCUMENTS

FR    2 899 734 A1    10/2007
FR    2 907 760 A1    5/2008
(Continued)

OTHER PUBLICATIONS

Translation of patent claims (FR 3017257 B1) provided by EPO patent translate. Printed frrom Espacenet Jun. 11, 2018.*

*Primary Examiner* — Fritz M Fleming
(74) *Attorney, Agent, or Firm* — Blank Rome LLP

(57) ABSTRACT

The invention relates to an electrical conversion and distribution system for an aircraft, the system comprising at least one synchronous starter-generator (S/G1, S/G2) intended to be coupled to an engine (Engine1) of the aircraft, at least one conversion path comprising a plurality of power converters (CVn, CV'n) associated with switching means suitable for supplying at least one charge (CAC1, CAC2, CAC3, CAC4, P1, P2) from at least one source (S/G1, S/G2, AUX S/G1, AUX S/G2, GPU1, GPU2), and at least one distribution path suitable for supplying electrical charges (CT1$n$, SW1$n$, CT2$n$, SW2$n$).

10 Claims, 3 Drawing Sheets

Figure 1A:
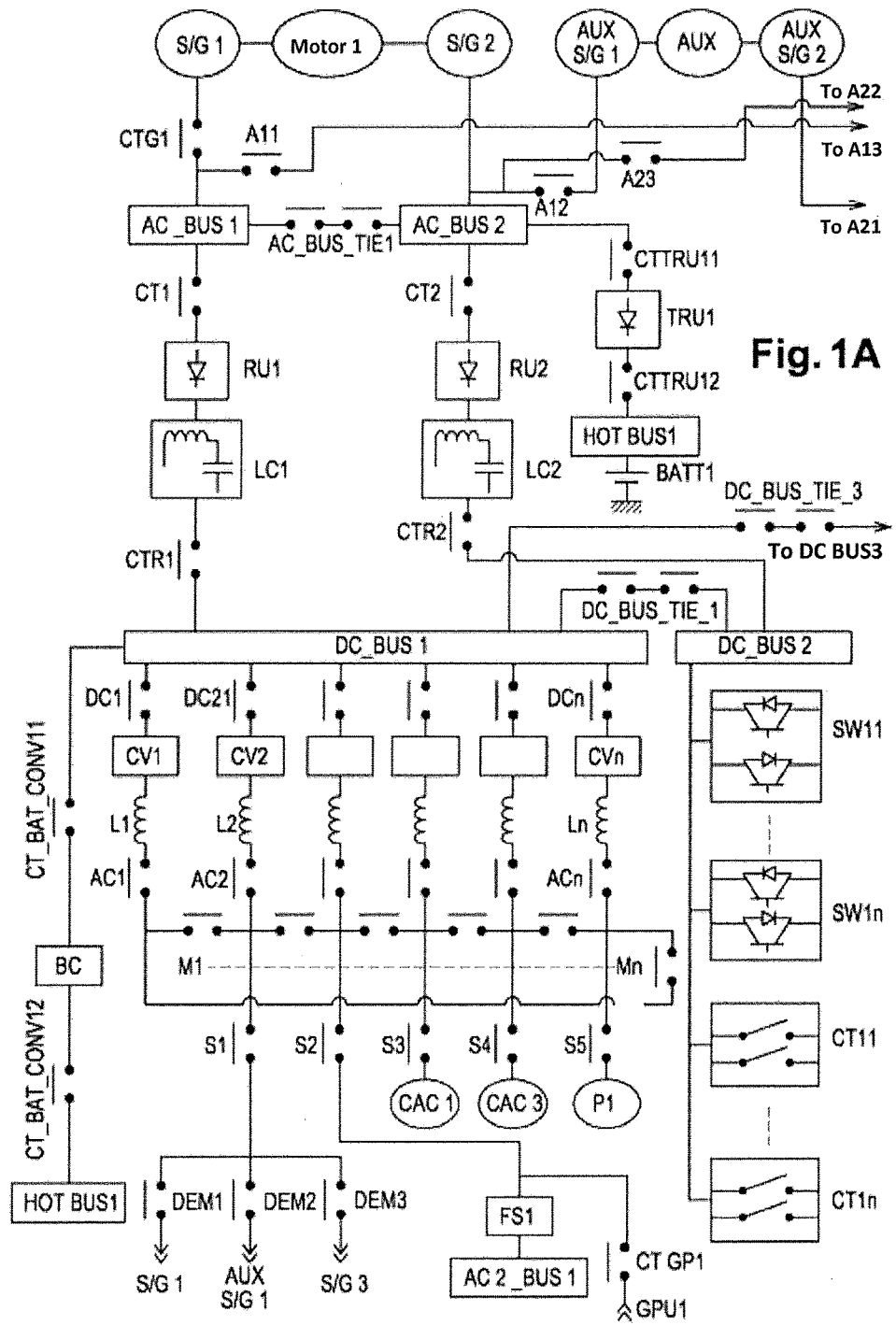

(51) Int. Cl.
*H02J 7/00* (2006.01)
*H02J 7/14* (2006.01)

(52) U.S. Cl.
CPC ........ *H02J 7/1423* (2013.01); *B64D 2221/00* (2013.01); *H02J 2007/143* (2013.01)

(56) References Cited

U.S. PATENT DOCUMENTS

| | | |
|---|---|---|
| 2008/0100136 A1 | 5/2008 | Langlois et al. |
| 2009/0091187 A1 | 4/2009 | Tardy |
| 2010/0193630 A1 | 8/2010 | Duces et al. |
| 2011/0273010 A1 | 11/2011 | Tardy |
| 2016/0380437 A1* | 12/2016 | Casimir ............... H02J 7/1415 307/9.1 |

FOREIGN PATENT DOCUMENTS

| | | | |
|---|---|---|---|
| FR | 2 907 762 A1 | 5/2008 | |
| FR | 2 930 084 A1 | 10/2009 | |
| FR | 3017257 B1 * | 11/2017 | ............... H02J 4/00 |

* cited by examiner

ELECTRICAL CONVERSION AND DISTRIBUTION SYSTEM FOR AN AIRCRAFT

The present invention relates to an electrical conversion and distribution system for an aircraft.

The aircraft is for example an air plane wherein non-propulsive systems are mainly supplied with electric power.

The non-propulsive systems in an aircraft are generally supplied by three power networks the power of which is derived from the plane engines or turbojet engines, namely a hydraulic power network, an electric power network and a pneumatic power network.

The hydraulic power network is typically used to supply actuators intended for flight control, landing gear extension and retraction systems, the front wheel guidance and braking systems.

The electric power network is generally used to supply the technical loads such as avionics, lighting, fuel pumps, fans and commercial loads such as the galleys (i.e. the kitchen areas) and the passenger entertainment systems.

Eventually, the pneumatic power is mainly used to supply system for pressurizing and air conditioning the cabin, the system for protecting the wing and nacelle against frost and the engine starting system.

New architectures for non-propulsive systems requiring a larger share of electrical energy have been developed recently. The technological advances in the field of electrical energy conversion offer the capacity of performing all the above functions with systems supplied with electrical power.

Using electrical or electromechanical systems including, among others, power electronics and actuators, has the following advantages.

Such systems are used only when necessary, so that the power draw on the aircraft engines can be optimized. Besides, the maintenance costs of such systems are lower than the maintenance costs of the hydraulic or pneumatic systems.

The main drawback, however, is the generalization of electrical systems with dedicated power electronic elements (dedicated power converters, etc . . . ).

Document FR 2907762 for example discloses an electrical conversion and distribution system for an aircraft, wherein each converter is dedicated to a particular function (supply of a motor-compressor of the air conditioning system, for instance).

It thus seems to be necessary to have an electrical conversion and distribution system for an aircraft, making it possible to reduce the number of power electronic elements, such as for example converters, while ensuring maximum functionality within the aircraft.

The invention more particularly aims at providing a simple, efficient and cost-effective solution to this problem.

For this purpose, it provides for an electrical conversion and distribution system for an aircraft, with the system comprising at least one synchronous generator-starter intended to be coupled to an engine of the aircraft, characterized in that it further comprises:
at least one conversion path comprising at least a first direct voltage bus connected to a plurality of power converters suitable for converting a direct voltage into an alternating voltage or conversely, at least one line intended to be connected to a charge requiring an alternating voltage and at least another line intended to be connected to an alternating voltage source with the conversion path further comprising first switching means suitable for selectively connecting or disconnecting each power converter to/from the first direct voltage bus, and second switching means suitable for selectively connecting or disconnecting each of said lines to/from each converter,
at least one distribution path comprising at least one second direct voltage bus suitable for supplying at least one electrical charge,
with the synchronous generator-starter being connected to the first and/or second direct voltage bus through at least one line equipped with a voltage rectifier.

The invention thus makes it possible for a set of power converters to be shared, with the various switching means thus supplying determined electrical charges from available sources, as needed.

Such architecture makes it possible to reduce the cost and weight of the electrical conversion and distribution system.

For example, the distribution path can make it possible to power electrical charges related to the flight controls, the landing gear, the de-icing systems or the pumps.

The conversion path specifically makes it possible to relate:
charges requiring alternating voltage supply and belonging to the air conditioning system of the cabin or to the NGS system ("Nitrogen Generating System"), and
alternating voltage sources such as the generator-starter operating in generator mode or "power ground units" or GPU.

It should be reminded that a voltage rectifier makes it possible to convert an alternating voltage into a direct voltage.

The system may include a first generator-starter and a second generator-starter intended to be coupled to the same engine of the aircraft, with the first generator-starter being connected to the first direct voltage bus, through a line equipped with a first voltage rectifier, with the second generator-starter being connected to the second direct voltage bus through another line equipped with a second voltage rectifier.

In this case, the first and second direct voltage buses are preferably suitable for being selectively interconnected through switching means. The switching means are for example formed by at least one contactor.

This way, the charges related to the second direct voltage bus can be supplied from the sources related to the first direct voltage bus.

Additionally, the first direct voltage bus and/or the second direct voltage bus is/are connected to at least one battery through a line equipped with a Boost converter.

It should be reminded here that a Boost-converter (also called parallel chopper) is a chopping regulator that converts a direct voltage into another direct voltage having a higher value.

It is thus possible to supply the corresponding direct voltage bus from the above-mentioned battery.

According to a significant characteristic, at least one battery is connected to the generator-starter through a line equipped with a transformer-rectifier.

It should be reminded now that a transformer-rectifier makes it possible both to change the voltage and amperage values of the electric current supplied and to convert alternating voltage into a direct voltage.

According to another significant characteristic, the conversion path comprises at least one line connecting an alternating voltage bus intended for a home network of the aircraft, to a switching matrix.

In particular, the line connecting the switching matrix to the alternating voltage bus for the home network can be equipped with a sine filter.

In addition, the system may comprise at least one auxiliary synchronous generator-starter to be coupled to an auxiliary power unit (or APU) and connected by a line to the first direct voltage bus and/or the second direct voltage bus.

In case of failure of one of the two generators-starters, it is then possible to supply all or part of the functions (and first and foremost, the functions requiring the highest availability rate) using the other generator-starter, through the first and/or second direct voltage bus.

According to an interesting embodiment, the system comprises:
- at least a first and a second synchronous generators-starters intended to be coupled to the same engine of the aircraft,
- at least a first and a second conversion paths each comprising at least a first direct voltage bus connected to a plurality of power converters able to convert a direct voltage into an alternating voltage or vice versa, at least one line intended to be connected to a charge and at least one other line intended to be connected to an alternating voltage source, with each conversion path further comprising first switching means suitable for selectively connecting or disconnecting each converter to/from the first direct voltage bus, and second switching means suitable for selectively connecting or disconnecting at least one of said lines to/from one of the converters,
- at least a first and a second distribution paths, with each one comprising at least a second direct voltage bus suitable for supplying electrical charges, with the first synchronous generator-starter being connected to the first and/or second direct voltage bus of the first conversion path or the first distribution path through at least one line equipped with a voltage rectifier, with the second synchronous generator-starter being connected to the first and/or second direct voltage bus of the second conversion path or second distribution path, through at least one line equipped with a voltage rectifier.

Using two generators-starters makes it possible to answer a potential failure of one of the generators-starters.

The invention also relates to an aircraft such as for example an air plane, characterized in that it comprises at least one system of the aforementioned type.

Figure 1B:
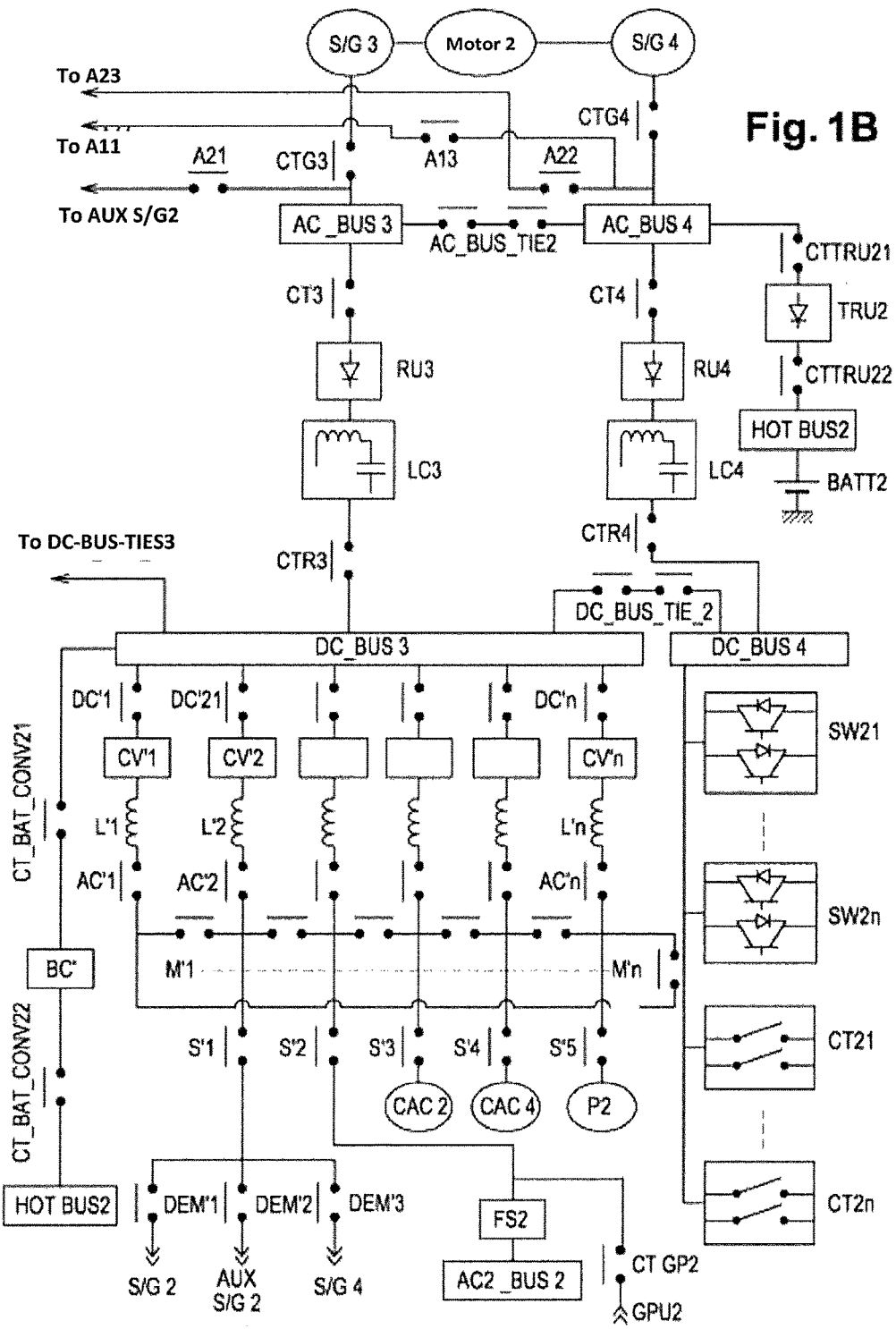
Figure 2:
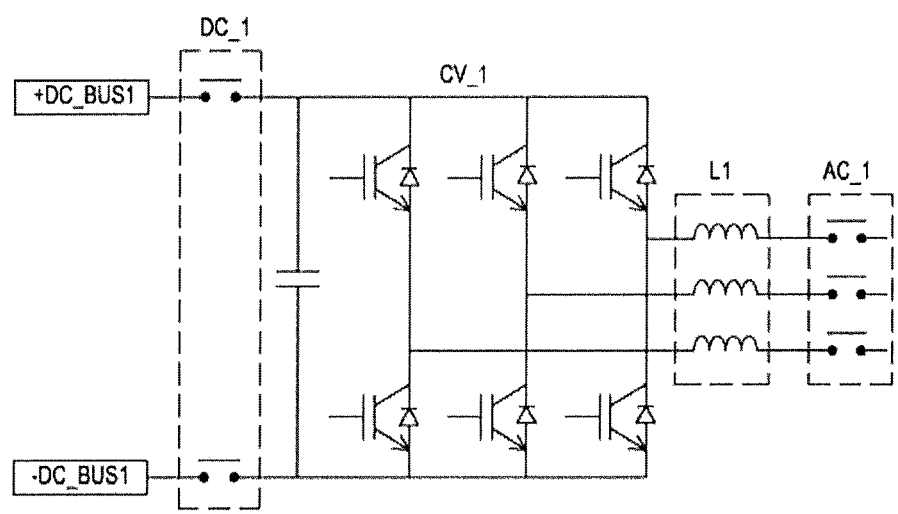

The invention will be better understood, and other details, characteristics and advantages of the invention will appear upon reading the following description given by way of a non restrictive example while referring to the appended drawings wherein:

FIG. 1 is a schematic view illustrating an embodiment of an electrical conversion and distribution system for an aircraft, in accordance with the foregoing, with such figure being divided into two parts respectively visible in FIG. 1A and FIG. 1B, FIG. 2 is a schematic view illustrating a part of the system of FIG. 1, including a power converter, An electrical conversion and distribution system for an aircraft, according to a preferred embodiment is illustrated in FIG. 1.

The aircraft conventionally has a first engine referenced Engine 1 (or turbojet) and a second engine referenced Engine 2. The first engine is rotationally coupled to a first synchronous generator-starter S/G1 and second synchronous generator-starter S/G2. Similarly, the second engine is coupled to a third generator-starter S/G3 and a fourth generator-starter S/G4. Each generator-starter is a synchronous machine able either to start the corresponding engine when powered by an alternating voltage (starter mode) or to generate an alternating voltage when the engine is started (generator mode). It should be noted here that, in generator mode, the generated voltage has a variable frequency which depends on the engine rotational speed. The voltage generated is for example 230V and the frequency ranges for instance from 360 to 800 Hz.

The air plane also has a first and a second auxiliary synchronous generators-starters AUX S/G1 and AUX S/G2 coupled to an auxiliary power unit referenced AUX.

The first starter-generator S/G1 is connected to a conducting bus bar DC BUS1 intended to supply a direct voltage, for example of the order of 540V, through a line successively equipped (from the first generator-starter S/G1 toward the first bus bar DC BUS1) with a contactor CTG1, a conducting bus bar AC BUS1 intended to supply an alternating voltage of the order of 230V at a variable frequency ranging from 360 to 800Hz (for example), a contactor CT1, a rectifier RU1, an LC filter noted LC1, and a contactor CTR1.

The rectifier RU1 makes it possible to convert the alternating voltage from the bar AC BUS1 into a direct voltage. The function of the filter LC1 is to limit the inrush current, stabilize voltage and filter the current harmonics.

The bar DC BUS1 belongs to a conversion path. This conversion path comprises a set of n power converters noted CV1, CV2, . . . , CVn connected in parallel to the bus bar DC BUS1 through lines equipped with contactors DC1, DC2, . . . DCn. The power converters are connected to charges or alternating voltage sources through lines equipped with three-phase inductors L1, L2, . . . , Ln, contactors AC1, AC2, . . . ACN, a switching matrix (consisting of contactors M1, M2, Mn), and contactors S1 to S5.

The power converters CV1, CV2, CVn make it possible to convert a direct voltage into an alternating voltage (inverter mode) or vice versa (rectifier mode).

The contactor S1 is supplied on a line connected for example to the generator-starter S/G1, to the starter-generator AUX S/G1 and to the generator-starter S/G3, respectively through contactors DEM1, and DEM2 DEM3 provided on different branches of the above-mentioned line.

The contactor S2 is provided on a line connected, for instance:
- on the one hand, to a conducting bus bar AC2 BUS1 through a branch equipped with a sine filter FS1, the function of which consists in filtering high frequencies so as to let the voltage wave fundamental generated by the converters through only,
- on the other hand, to a branch intended to be connected to a first ground power unit GPU1 through a contactor CT GP1.

The bar AC2 BUS1 is intended to supply a home network aboard the air plane, with an alternating voltage of 115V to 400 Hz.

The contactors S3, S4 and S5 equip lines intended to supply motorized charges. Such charges may be, for instance, compressors of an air conditioning circuit in the cabin of the aircraft CAC1 and CAC3 and a pump P1 respectively.

The second generator-starter S/G2 is connected to a conducting bus bar DC BUS2 intended to supply a direct voltage, for example of the order of 540V, through a line successively equipped with (from the second generator-starter S/G2 towards the second conducting bus bar DC BUS2) a contactor CGT2, a conducting bus bar AC BUS2 intended to supply an alternating voltage of the order of 230V at a variable frequency, for example ranging from 360 to 800 Hz, a contactor CT2, a rectifier RU2, an LC filter noted LC2 and a contactor CTR2.

The bars DC BUS1 and DC BUS2 are connected through a line equipped with a contactor DC BUS TIE1. The bars AC BUS1 and AC BUS2 are connected through a line equipped with a contactor AC BUS TIE1.

The bar AC BUS1 and/or the bar AC BUS2 are connected to a conducting bus bar HOT BUS1 intended to supply a direct voltage, for example of the order of 28V, through a line successively equipped with (from the bar ACBUS1 or ACBUS2 to the bar HOT BUS1) a contactor CTTRU11, a transformer-rectifier TRU1 and a contactor CTTRU12. A battery BATT1 is connected to the bar HOT BUS1.

The battery BATT1 is also connected to the bar DC BUS1 through (from the battery BATT1 to the bar DC BUS1) the bar HOT BUS1, a contactor CTBATCONV12, a converter Boost BC and a contactor CTBATCONV11.

The bar DC BUS2 belongs to a distribution path making it possible to supply one or more so-called technical electric charge(s), connected in parallel to the bus DC BUS2:
- through contactors CT11, CT12, CT1, . . . , CT1n, when the technical charges are high-power ones, such as a flight control power system, a de-icing system, a landing gear braking system, etc . . . , for instance,
- through Solid State Power Controllers SW11, SW12, . . . , SW1n, when the technical charge are low-power ones, such as the secondary flight control actuators, for instance.

Such architecture is thus mixed in that it comprises a distribution path and a conversion path.

The third generator-starter S/G3 is connected to a conducting bus bar DC BUS3 intended to supply a direct voltage, for example of the order of 540V, through a line successively equipped with (from the third starter-generator S/G3 towards the conducting bus bar DC BUS3), a contactor CGT3, a conducting bus bar AC BUS3 intended to supply an alternating voltage of the order of 230V at a variable frequency, for example ranging from 360 to 800 Hz, a contactor CT3, a rectifier RU3, an LC filter noted LC3 and a contactor CTR3.

As mentioned above, the bar DC BUS3 belongs to a conversion path. This conversion path comprises a set of n power converters noted CV'1, CV'2, . . . , CV'n connected in parallel to the bus bar DC BUS3 through lines equipped with contactors DC'1, DC'2, . . . DC'n. The power converters are connected to charges or alternating voltage sources through lines equipped with inductors L'1, L'2, . . . , L'n, contactors AC'1, AC'2, . . . AC'n, a switching matrix (consisting of contactors M'1, M'2, M'n), and contactors S'1 to S'5.

The power converters CV'1, CV'2, CV'n make it possible to convert a direct voltage into an alternating voltage (inverter mode) or vice versa (rectifier mode).

The contactor S'1 is supplied on a line connected for example to the generator-starter S/G2, to the generator-starter AUX S/G2 and to the generator-starter S/G4, respectively through contactors DEM'1, and DEM'2 DEM'3 provided on different branches of the above-mentioned line.

The contactor S'2 is provided on a line connected, for instance:
- on the one hand, to a conducting bus bar AC2 BUS2 through a branch equipped with a sine filter FS2, the function of which consists in cutting the voltage wave so as to filter the high frequencies,
- on the other hand, to a branch intended to be connected to a first ground power unit GPU2 through a contactor CT GP2.

The bar AC2 BUS2 is intended to supply a home network aboard the air plane, with an alternating voltage of 115V to 400Hz.

The contactors S'3, S'4 and S'5 equip lines intended to be connected to motorized charges, compressors of an air conditioning circuit of the cabin in the aircraft CAC2 and CAC4 and a pump P2, respectively.

The second generator-starter S/G4 is connected to a conducting bus bar DC BUS4 intended to supply a direct voltage, for example of the order of 540V, through a line successively equipped with (from the fourth generator-starter S/G4 towards the second conducting bus bar DC BUS4) a contactor CGT4, a conducting bus bar AC BUS4 intended to supply an alternating voltage of the order of 230V at a variable frequency, for example ranging from 360 to 800 Hz, a contactor CT4, a rectifier RU4, an LC filter noted LC4 and a contactor CTR4.

The bars DC BUS3 and DC BUS4 are connected through a line equipped with a contactor DC BUS TIE2. The bars AC BUS3 and AC BUS4 are connected through a line equipped with a contactor AC BUS TIE2.

The bar AC BUS3 and/or the bar AC BUS4 are connected to a conducting bus bar HOT BUS2 intended to supply a direct voltage, for example of the order of 28V, through a line successively equipped with (from the bar ACBUS3 or ACBUS4 to the bar HOT BUS2) a contactor CTTRU21, a transformer-rectifier TRU2 and a contactor CTTRU22. A battery BATT21 is connected to the bar HOT BUS2.

The battery BATT2 is also connected to the bar DC BUS3 through (from the battery BATT2 to the bar DC BUS1) the bar HOT BUS2, a contactor CTBATCONV22, a converter Boost BC' and a contactor CTBATCONV21.

The bar DC BUS4 belongs to a distribution path making it possible to supply one or more so-called technical electrical charge(s), connected in parallel to the bus DC BUS4:
- through contactors CT21, CT22 . . . , CT2n, when the technical charges are high-power ones, such as a flight control power system, a de-icing system, a landing gear braking system, etc . . . , for instance,
- through Solid State Power Controllers SW21, SW22, SW2n, when the technical charges are low-power ones, such as the secondary flight control actuators, for instance.

The bars AC BUS1 and ACBUS 4 are interconnected through a line equipped with contactors A11 and A13, with said line being also connected at a point between said two contactors mentioned above, to the generator-starter AUX S/G1.

The generator-starter AUX S/G1 is connected to the AC BUS1, AC BUS2 and AC BUS4 through lines equipped with contactors A11, A12 and A13 respectively. Besides, the second generator-starter AUX S/G2 is connected to the bars AC BUS3, AC BUS4 and AC BUS2 through lines equipped with contactors A21, A22 and A23 respectively.

The bars DC BUS1 and DC BUS3 are connected through a line equipped with a contactor DC BUS TIE3.

The contactors mentioned above can be controlled between open and closed states, so as to allow or not the passage of current through the power line or the corresponding branch.

FIG. 2 illustrates the structure of a particular power converter CV1, . . . , CVn, Cv'1, CV'n. Each power converter has a conventional structure of the three-phase converter type, comprising six switching cells, with each cell comprising a diode and a transistor, in particular an insulated gate bipolar transistor (IGBT). In addition, the inductors L1, . . . , Ln are three-phase inductors, with such inductors facilitating the parallel operation of power converters and the reversibility thereof.

This mixed architecture (conversion/distribution) makes it possible to share and standardize power electronics (power converters, . . . ) while being adapted to different operating modes.

In particular, it is possible to supply the above-mentioned electrical charges, using sources S/G1, S/G2, S/G3, S/G4 through conversion paths and distribution paths. In case of failure of one of the generators-starters, it is possible to supply power to at least part of the above charges (especially the so-called critical charges) using the other generators-starters.

Similarly, on the ground, it is possible to supply all or part of the charges, using ground power units GPU1 and/or GPU2, or generators-starters AUX S/G1 and AUX S/G2.

Finally, the electrical charges can be supplied in whole or part using the batteries BATT1 and the BATT2 connected to the bars HOT BUS1 and BUS2 HOT, more particularly through the converters Boost BC and BC'.

The invention claimed is:

1. An electrical conversion and distribution system for an aircraft, with the system comprising:
   at least one synchronous generator-starter intended to be coupled to an engine of the aircraft,
   at least one conversion path comprising at least a first direct voltage bus connected to a plurality of power converters suitable for converting a direct voltage into an alternating voltage or conversely, at least one line intended to be connected to a charge requiring an alternating voltage and at least another line intended to be connected to an alternating voltage source, with the conversion path further comprising first switching means suitable for selectively connecting or disconnecting each power converter to/from the first direct voltage bus, and second switching means suitable for selectively connecting or disconnecting each of said lines to/from each converter,
   at least one distribution path comprising at least one second direct voltage bus suitable for supplying at least one electrical charge,
   with the synchronous generator-starter being connected to the first and/or second direct voltage bus through at least one line equipped with a voltage rectifier.

2. A system according to claim 1, further comprising a first generator-starter and a second generator-starter intended to be coupled to the same engine of the aircraft, with the first generator-starter being connected to the first direct voltage bus through a line equipped with a first voltage rectifier, with said second generator-starter being connected to the second direct voltage bus through another line equipped with a second voltage rectifier.

3. A system according to claim 1 wherein the first and second direct voltage buses are suitable for being selectively connected together through switching means.

4. A system according to claim 1, wherein the first direct voltage bus and/or the second direct voltage bus is/are connected to at least one battery through a line equipped with a Boost converter.

5. A system according to claim 1, wherein at least one battery is connected to the generator-starter through a line equipped with a transformer-rectifier.

6. A system according to claim 1, wherein the conversion path comprises at least one line connecting an alternating voltage bus intended for a home network of the aircraft, to a switching matrix.

7. A system according to claim 6, wherein the line connecting the switching matrix to the alternating voltage bus intended for the home network is provided with a sine filter.

8. A system according to claim 1, further comprising at least one auxiliary synchronous generator-starter intended to be coupled to an auxiliary power unit and connected through a line to the first direct voltage bus and/or the second direct voltage bus.

9. A system according to claim 1, further comprising:
   at least a first and a second synchronous generators-starters intended to be coupled to the same engine of the aircraft,
   at least a first and a second conversion paths, each comprising at least a first direct voltage bus connected to a plurality of power converters suitable for converting a direct voltage into an alternating voltage or conversely, at least one line intended to be connected to a charge and at least one other line intended to be connected to an alternating voltage source, with each conversion path further comprising first switching means suitable for selectively connecting or disconnecting each converter to/from the first direct voltage bus, and second switching means suitable for selectively connecting or disconnecting at least one of said lines to/from one of the converters,
   at least a first and a second distribution paths, each comprising at least a second direct voltage bus suitable for supplying electrical charges,
   with the first synchronous generator-starter being connected to the first and/or second direct voltage bus of the first conversion path or the first distribution path through at least a line equipped with a voltage rectifier,
   with the second synchronous generator-starter being connected to the first and/or second direct voltage bus of the second conversion path or the second distribution path, through at least one line equipped with a voltage rectifier.

10. An aircraft, comprising at least one system according to claim 1.

* * * * *